US011927028B2

(12) United States Patent
Mahlanen et al.

(10) Patent No.: US 11,927,028 B2
(45) Date of Patent: Mar. 12, 2024

(54) POWER PLANT CONSTRUCTION

(71) Applicant: WÄRTSILÄ FINLAND OY, Vaasa (FI)

(72) Inventors: Timo Mahlanen, Vaasa (FI); Juha Kerttula, Vaasa (FI); Reijo Leikas, Vaasa (FI); Botvid Lindström, Vaasa (FI); Markus Sandås, Vaasa (FI)

(73) Assignee: WÄRTSILÄ FINLAND OY, Vaasa (FI)

(*) Notice: Subject to any disclaimer, the term of this patent is extended or adjusted under 35 U.S.C. 154(b) by 57 days.

(21) Appl. No.: 17/549,141

(22) Filed: Dec. 13, 2021

(65) Prior Publication Data

US 2022/0106803 A1 Apr. 7, 2022

Related U.S. Application Data

(63) Continuation of application No. PCT/FI2020/050179, filed on Mar. 23, 2020.

(51) Int. Cl.

| | |
|---|---|
| ***E04H 5/02*** | (2006.01) |
| ***E04B 1/82*** | (2006.01) |
| ***E04B 2/58*** | (2006.01) |
| ***F02B 63/04*** | (2006.01) |

(52) U.S. Cl.

CPC ............ *E04H 5/02* (2013.01); *E04B 1/8209* (2013.01); *E04B 2/58* (2013.01); *F02B 63/04* (2013.01)

(58) Field of Classification Search

CPC ......... E04H 5/02; E04H 1/1238; E04H 1/005; E04B 1/8209; E04B 2/58; F02B 63/04

See application file for complete search history.

(56) References Cited

U.S. PATENT DOCUMENTS 9,212,499 B1 * 12/2015 Maurer .................... H02B 7/06
9,534,370 B2 * 1/2017 Kokoschka ........... E04H 1/1238

(Continued)

FOREIGN PATENT DOCUMENTS

CN 105019695 A 11/2015
EP 2910711 A1 8/2015

(Continued)

OTHER PUBLICATIONS

International Search Report (PCT/ISA/210) and Written Opinion (PCT/ISA/237) dated Jul. 6, 2020, by the European Patent Office as the International Searching Authority for International Application No. PCT/FI2020/050179.

*Primary Examiner* — Gisele D Ford

(74) *Attorney, Agent, or Firm* — BUCHANAN INGERSOLL & ROONEY PC

(57) ABSTRACT

An exemplary power plant construction is configured to accommodate an internal combustion engine and a generator driven by the internal combustion engine, and includes a front wall, a rear wall and side walls, at least the side walls being modular walls having at least two wall modules arranged one upon the other, the wall modules being self-supporting modules having a shape of a rectangular prism, wherein the wall modules arranged one upon the other form a self-supporting wall, and wherein the uppermost wall module of each side wall includes a beam that is parallel to the longitudinal direction of the side walls and configured to function as a runway beam of an overhead crane.

20 Claims, 8 Drawing Sheets

(56) References Cited

U.S. PATENT DOCUMENTS

| | | | | |
|---|---|---|---|---|
| 2014/0053599 | A1* | 2/2014 | Byfield | F25J 1/0022 29/890.035 |
| 2016/0010916 | A1* | 1/2016 | Byfield | F28B 1/06 62/611 |
| 2022/0098886 | A1* | 3/2022 | More | E04H 5/02 |

FOREIGN PATENT DOCUMENTS

| | | | |
|---|---|---|---|
| WO | 2017140765 | A1 | 8/2017 |
| WO | 2018075718 | A1 | 4/2018 |

* cited by examiner

POWER PLANT CONSTRUCTION

RELATED APPLICATION

This application claims priority as a continuation application under 35 U.S.C. § 120 to PCT/FI2020/050179, which was filed as an International Application on Mar. 23, 2020 designating the U.S., and which claims priority to Finnish Application 20195502 filed in Finland on Jun. 12, 2019. The entire contents of these applications are hereby incorporated by reference in their entireties.

FIELD

The present disclosure relates to a power plant construction that is configured to accommodate an internal combustion engine and a generator driven by the internal combustion engine.

BACKGROUND INFORMATION

Power plants that are based on internal combustion engines and generators that are driven by the internal combustion engines provide a flexible solution to power demand for example in power grids where the power demand may change rapidly or where the power supply varies due to the varying availability of solar power, wind power or other renewable energy. Such power plants are also convenient as emergency power plants, as the engines can be started up quickly.

Power plants can often be constructed using standard engines and generators that do not require significant customization. However, the engines and the generators also need a building to protect the engine and the generator, and planning and construction of the building can form a significant part of a power plant project. There is thus a need for a power plant construction, which can make power plant projects simpler and shorter.

SUMMARY

A power plant construction as disclosed can be configured to accommodate an internal combustion engine and a generator driven by the internal combustion engine, the power plant construction comprising: a front wall; a rear wall; a first side wall; and a second side wall, wherein at least the first side wall and the second side wall of the power plant construction are constructed as modular walls, each modular wall including at least two wall modules arranged one upon the other, the wall modules being self-supporting modules having a shape of a rectangular prism, wherein the wall modules arranged one upon the other form a self-supporting wall, wherein an uppermost wall module of the first side wall and an uppermost wall module of the second side wall include a beam that is parallel to the longitudinal direction of the side walls and configured to function as a runway beam of an overhead crane and wherein each runway beam is a structural element of a wall module.

BRIEF DESCRIPTION OF THE DRAWINGS

Exemplary embodiments of the invention are described below in more detail with reference to the accompanying drawings, in which.

DETAILED DESCRIPTION

Figure 1:
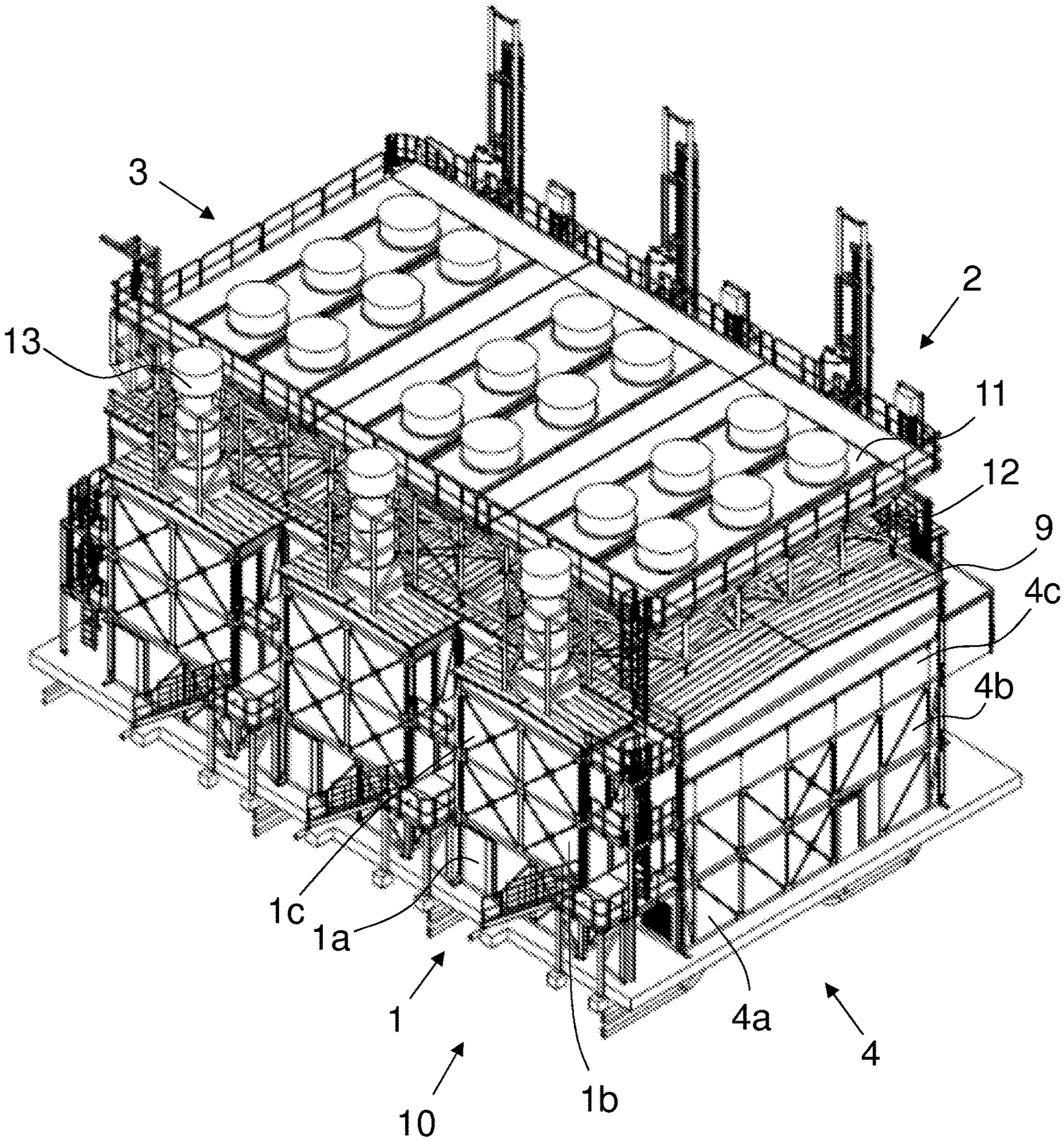
FIG. 1 shows a front view of a power plant according to an exemplary embodiment disclosed herein.
Figure 2:
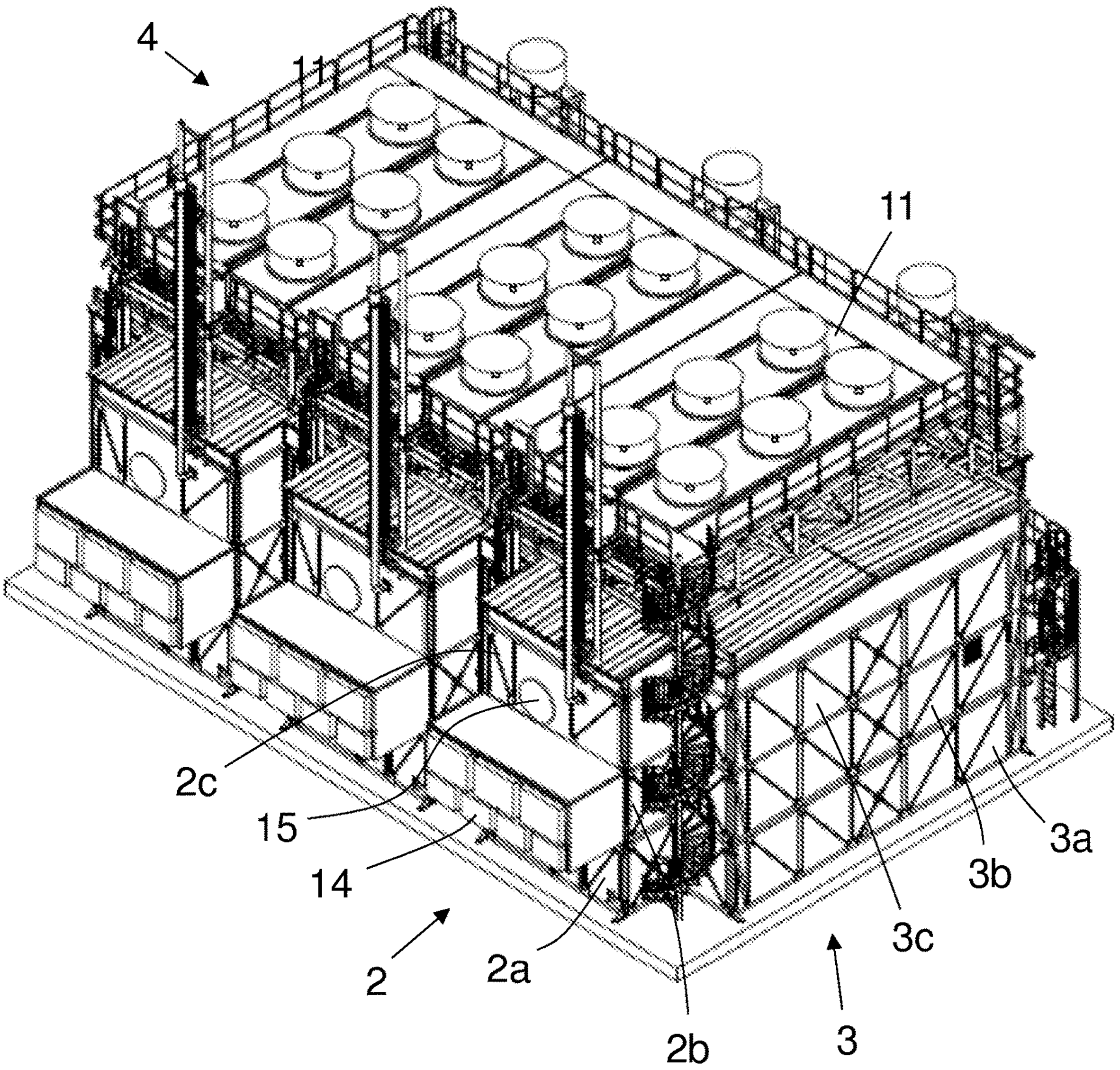
FIG. 2 shows a rear view of the exemplary power plant of FIG. 1.
Figure 3:
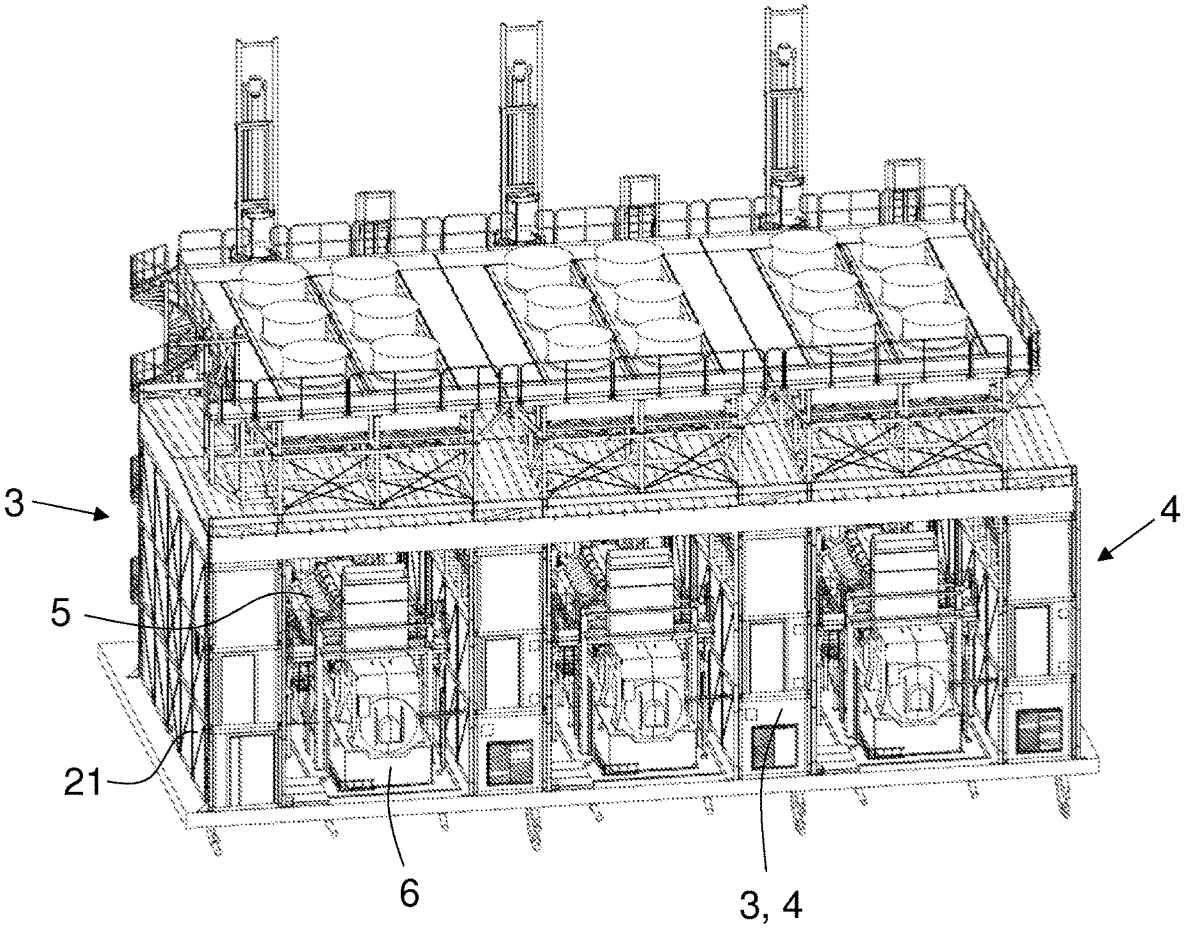
FIG. 3 shows an exemplary power plant without front walls.

The present disclosure provides an improved power plant construction that is configured to accommodate an internal combustion engine and a generator driven by the internal combustion engine.

An exemplary power plant construction according to the present disclosure can include a front wall, a rear wall, a first side wall and a second side wall, at least the first side wall and the second side wall of the power plant construction being constructed as modular walls, each modular wall having at least two wall modules arranged one upon the other, the wall modules being self-supporting modules having a shape of a rectangular prism, wherein the wall modules arranged one upon the other form a self-supporting wall, and wherein an uppermost wall module of the first side wall and an uppermost wall module of the second side wall includes a beam that is parallel to the longitudinal direction of the side walls and configured to function as a runway beam of an overhead crane.

Because of the self-supporting wall modules, the power plant construction can be erected quickly using pre-fabricated modules. The overhead crane can be used for maintenance and repair of the engine, generator and different auxiliary devices. If the crane is installed before installation of the engine and the generator, it can also be used for installing different parts and equipment of the engine and the generator. Integrated runway beams facilitate construction of a power plant and runway beams located within the wall modules allow operating the crane close to the walls, which allows effective utilization of the space within the power plant construction.

According to an exemplary embodiment, the front wall and the rear wall are constructed as modular walls. All the walls of the power plant construction can thus include stacked wall modules.

According to an exemplary embodiment, each modular wall includes three wall modules arranged one upon the other. With three stacked wall modules, the power plant construction can be made high enough for accommodating a large engine and a generator, but the height of the wall modules can be kept low enough to allow easy transportation of the wall modules.

According to an exemplary embodiment, each wall module is configured to fit into a standardized intermodal container, such as a 40-foot high-cube container. This allows easy transportation of the wall modules. The containers also protect the wall modules until the construction of the power plant.

According to an exemplary embodiment, each wall module includes a steel frame.

According to an exemplary embodiment, at least one side wall of each wall module includes a sound insulating panel.

An exemplary power plant according to the present disclosure includes a power plant construction defined above and an internal combustion engine and a generator coupled to the engine arranged within the construction.

According to an exemplary embodiment, the power plant includes at least two power plant constructions defined above.

According to an exemplary embodiment, two adjacent power plant constructions share a common side wall. This reduces the space needed for the power plant and also decreases investment costs of the power plant.

According to an exemplary embodiment, one or more wall modules of the common side wall includes equipment serving both engines of the adjacent power plant constructions.

According to an exemplary embodiment, a side wall at one end of the power plant is provided with equipment serving all the engines of the power plant. For instance, a water tank for supplying water to cooling water systems of the engines can be arranged within the side wall.

According to an exemplary embodiment, one or more wall modules of the rear wall of a power plant construction is provided with a fluid connection to a corresponding wall module of an adjacent power plant construction. The fluid connection can be, for instance, a connection for lube oil, cooling liquid and/or fresh water. The fluid connection allows connecting auxiliary systems of the engines of adjacent power plant constructions to a common fluid circuit.

According to an exemplary embodiment, each power plant construction of the power plant is arranged on a foundation frame that is made of steel beams. The foundation frame ensures that all the walls of a power plant construction are arranged at the same level. The foundation frame also helps positioning of the walls, which speeds up the construction of the power plant. The foundation frame can be configured and designed to allow easy expansion of a power plant by adding new power plant constructions adjacent to the existing power plant constructions.

The figures show different views of parts of power plants having power plant constructions 10 according to exemplary embodiments disclosed herein. FIGS. 1-4 and 6 show part of an exemplary power plant having three power plant constructions 10. However, a power plant can include a single power plant construction according to exemplary embodiments disclosed herein.

An exemplary power plant construction 10 as disclosed is configured to accommodate an internal combustion engine 5 and a generator 6 driven by the engine 5. An engine hall is thus formed within the power plant construction 10. The engine 5 can be a large piston engine having a rated power of at least 150 kw per cylinder, or lesser or greater. The cylinder diameter of the engine can be at least approximately 150 mm or greater. The engine 5 can include any reasonable number of cylinders, which can be arranged, for instance, in line or in a V-configuration.

The engine 5 and the generator 6 form part of a power plant, which produces electric power. The power plant can be connected to a public power-distribution network, or it can produce electricity for example for an industrial plant or a mine. The power plant can function as a main power source of a power-distribution network, in which case it can be operated mainly at the rated power. Alternatively, the main function of the power plant can be balancing of the power supply and power demand in a power-distribution network, in which case the ability of internal combustion engines to quickly adapt to changing load is utilized. The power plant can also be used as an emergency power plant, which can be started up when normal power supply in a power-distribution network is cut.

An exemplary power plant construction 10 can include a front wall 1, a rear wall 2, a first side wall 3 and a second side wall 4. The rear wall 2 is arranged opposite to the front wall 1 and the second side wall 4 is arranged opposite to the first side wall 3. The front wall 1, rear wall 2 and side walls 3, 4 form a closed perimeter, which delimits a space for accommodating an engine 5 and a generator 6. The power plant construction 10 is configured to accommodate one internal combustion engine 5 and one generator 6 that is coupled to the engine 5. The shaft of the generator 6 is aligned with the shaft of the engine 5. The axial direction of the shafts of the engine 5 and the generator 6 is the axial direction of the engine-generator set (genset) formed by the engine 5 and the generator 6. The power plant construction 10 is configured to accommodate the genset so that the longitudinal direction of the side walls 3, 4 is parallel to the axial direction of the genset. The side walls 3, 4 are longer than the front wall 1 and the rear wall 2. In the exemplary embodiments of the figures, the generator 6 is arranged close to the front wall 1 of the power plant construction 10. The driving end of the engine 5 thus faces the front wall 1.

The exemplary power plant construction 10 can include a roof 9. The roof 9 is supported by the first side wall 3 and the second side wall 4. Radiators 11 are arranged above the roof 9 of the power plant construction 10. The radiators 11 are supported by a support frame 12. In the exemplary embodiments of the figures, the support frame 12 is supported by the first side wall 3 and the second side wall 4. The radiators 11 are configured to cool down cooling water of the engine 5.

The walls 1, 2, 3, 4 of the exemplary power plant construction 10 are modular walls. Each wall 1, 2, 3, 4 of the power plant construction 10 is made of wall modules 1*a*, 2*a*, 3*a*, 4*a*, 1*b*, 2*b*, 3*b*, 4*b*, 1*c*, 2*c*, 3*c*, 4*c*.

In the exemplary embodiments of the figures, each wall 1, 2, 3, 4 includes three wall modules. Each exemplary wall module has a shape of a rectangular prism. The shape of the wall modules thus resembles the shape of a container, such as the shape of a ship container. Each wall module has a bottom, top, two sides and two ends. The bottom of the wall module faces downwards in the intended use of the wall module. The top of the wall module is located opposite to the bottom. The ends of the wall module are located opposite to each other and the sides are located opposite to each other. The sides are longer than the ends. At least one side of each wall module is closed. Each wall module is thus provided with at least one side wall. Alternatively, one or more wall panels can be arranged in the middle of the wall module for dividing the wall module in the longitudinal direction into two or more compartments. Depending on the wall module, the top of the wall module can be either open or closed. Also the bottom can be either open or closed.

The exemplary wall module can thus include a floor and/or a roof. With wall modules having an open bottom or top, equipment requiring in the vertical direction more space than is available within one wall module can be accommodated within the front wall 1, rear wall 2 or a side wall 3, 4. In the exemplary embodiments of the figures, the ends of the wall modules are closed. The wall modules are thus provided with end walls. One or more of the side walls and/or the end walls of a wall module can be provided with a door. The floor and/or roof of a wall module can be provided with a hatch or a manhole.

The exemplary wall modules are self-supporting structures. The wall modules can be stacked upon each other without a need for additional support structures. The wall modules can be provided with fastening elements for fastening an upper wall module to a lower wall module. The stacked wall modules thus form a self-supporting wall.

In the exemplary embodiments of the figures, each wall 1, 2, 3, 4 is made of one stack of wall modules. Each wall 1, 2, 3, 4 is configured to stand independently of the other walls. The walls can thus be erected in any order. The wall modules can be provided with fastening elements for fastening the front wall 1 and the rear wall 2 to the side walls 3, 4.

Each wall module 1*a*, 2*a*, 3*a*, 4*a*, 1*b*, 2*b*, 3*b*, 4*b*, 1*c*, 2*c*, 3*c*, 4*c* includes a frame that is made of steel elements. The frame can be a welded steel structure. Each closed surface of a wall module can be made of one or more panels, which can be, for example, sandwich structures and/or made of a composite material. At least one of the side walls of each wall module includes a sound-insulating panel 21. If both sides of a wall module are closed, both sides can be made of sound-insulating panels. Also the ends, bottom and/or roof of the wall module can include sound-insulating panels. The wall panels can also be fire resistant. Each engine hall can thus form an own fire compartment.

All the wall modules are, for example, configured to fit into an intermodal container determined in an ISO standard. One 40-foot long high-cube container; e.g., a container having external height of 9 feet 6 inches can receive one wall module. Because the wall modules can be fit into standardized containers, they are easy to transport to a power plant construction site.

The front wall 1 of the exemplary power plant construction 10 includes a first wall module 1*a*, which is the lowermost wall module, a second wall module 1*b* arranged on top of the first wall module 1*a* and a third wall module 1*c*, which is arranged on top of the second wall module 1*b* and forms the uppermost wall module. The rear wall 2, the first side wall 3 and the second side wall 4 include in a similar way a first wall module 2*a*, 3*a*, 4*a*, a second wall module 2*b*, 3*b*, 4*b* and a third wall module 2*c*, 3*c*, 4*c*. All the first wall modules 1*a*, 2*a*, 3*a*, 4*a* have the same height with each other, all the second wall modules 1*b*, 2*b*, 3*b*, 4*b* have the same height with each other and all the third wall modules 1*c*, 2*c*, 3*c*, 4*c* have the same height with each other. All the wall modules 1*a*, 1*b*, 1*c* of the front wall 1 have the same width and length with each other, all the wall modules 2*a*, 2*b*, 2*c* of the rear wall 2 have the same width and length with each other, all the wall modules 3*a*, 3*b*, 3*c* of the first side wall 3 have the same width and length with each other, and all the wall modules 4*a*, 4*b*, 4*c* of the second side wall 4 have the same width and length with each other. The wall modules 3*a*, 3*b*, 3*c*, 4*a*, 4*b*, 4*c* of the side walls 3, 4 are longer than the wall modules 1*a*, 1*b*, 1*c*, 2*a*, 2*b*, 2*c* of the front wall 1 and the rear wall 2.

The exemplary power plant construction 10 can include an air outlet channel 13. The air outlet channel 13 can be arranged at the front end of the power plant construction 10 and extends upwards from the front wall 1. The air outlet channel 13 is configured to ventilate the engine hall. An air inlet 14 for the intake air of the engine 5 is arranged at the rear end of the power plant construction 10. The air inlet 14 is in a side wall of the second wall module 2*b*; e.g., the middle wall module of the rear wall 2. The air inlet 14 is provided with filters for filtering the intake air. Also an exhaust outlet 15 is arranged at the rear end. The exhaust outlet 15 is in a side wall of the third, e.g., the uppermost wall module 2*c* of the rear wall 2. Via the exhaust outlet 15, exhaust gas from the engine 5 is conducted out of the power plant construction 10.

As shown in FIGS. 1-4 and 6, one exemplary power plant can include several power plant constructions, in the example of the figures three. Each power plant construction 10 includes one engine 5 and a generator 6 coupled to the engine 5. Each engine 5 is provided with an exhaust duct, which is brought via the exhaust outlet 15 of the power plant construction 10 out from the engine hall and connected to a chimney (not shown). Two adjacent power plant constructions 10 share a common side wall 3, 4. A first side wall 3 of one power plant construction 10 thus forms a second side wall 4 of another power plant construction 10. One or more wall modules of a common side wall 3, 4 can include equipment that serves two engines 5. Due to the shared side walls 3, 4, the space required by the power plant can be smaller, less time is needed for the construction work and the investment cost is lower. A side wall 3, 4 at one end of the power plant can include equipment serving all the engines 5 of the power plant. For instance, a wall module can include a maintenance water tank and/or related devices for supplying water to cooling water systems of the engines 5 of the power plant constructions 10. The water tank or other equipment can extend inside two or more wall modules of the side wall 3, 4. A lower wall module can thus have an open top and an upper wall module can have an open bottom to accommodate equipment that cannot be fit in the vertical direction within a single wall module.

Figure 7:
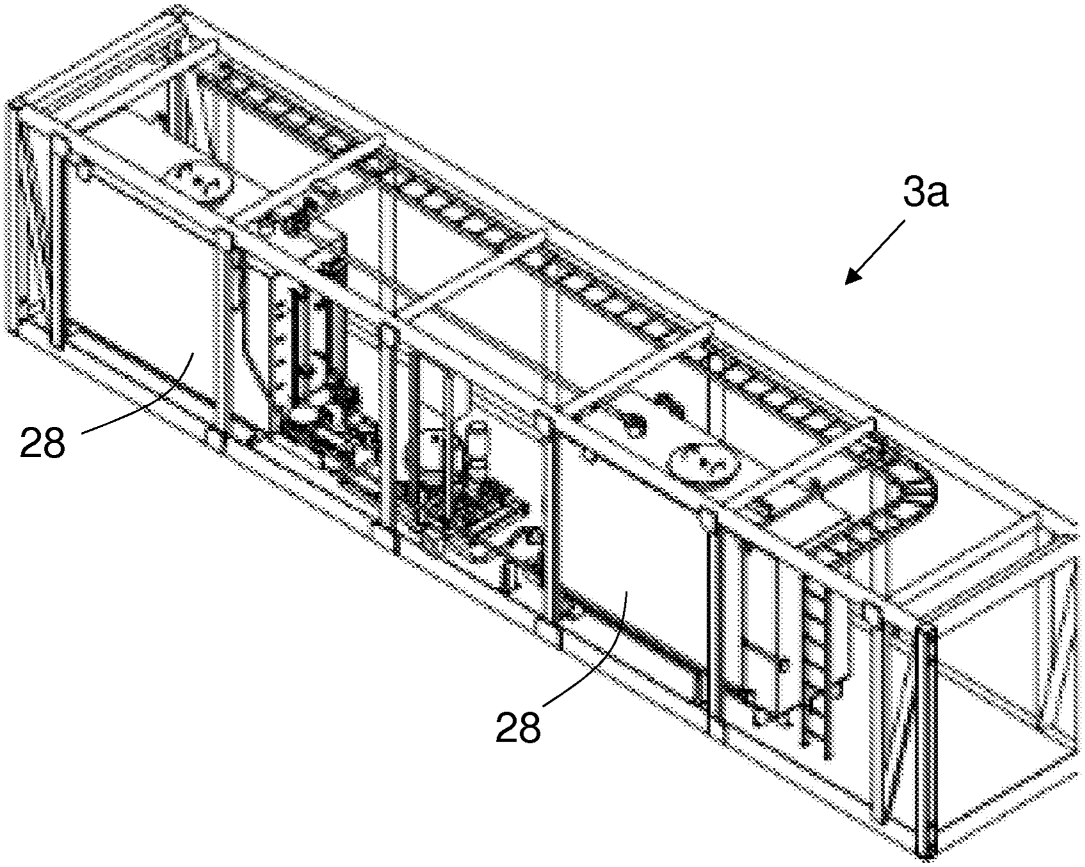
FIG. 7 shows an example of a wall module of an exemplary power plant construction.

FIG. 7 shows an example of a first wall module 3*c* of a first side wall 3. The wall module 3*a* is provided with two maintenance water tanks 28, which are arranged to supply water to cooling water systems of all the engines 5 of a power plant. The wall module 3*a* is part of a first side wall 3 at one end of a power plant that includes at least two power plant constructions 10. Because the maintenance water tanks 28 are arranged at one end of the power plant, the wall modules between the power plant constructions 10 and at the other end of the power plant can include other equipment that serves an engine in an adjacent power plant construction 10.

The engines 5 of exemplary adjacent power plant constructions 10 can share some auxiliary systems and/or the auxiliary systems of the engines can be connected to each other, to a common control system, or to a system supplying, for example, low-voltage power, medium-voltage power, water or compressed air. One or more wall modules of the front wall 1 and/or the rear wall 2 can be provided with one or more fluid connections for an adjacent power plant construction 10. A wall module can include a fluid connection for instance for lube oil, compressed air and/or water.

Figure 4:
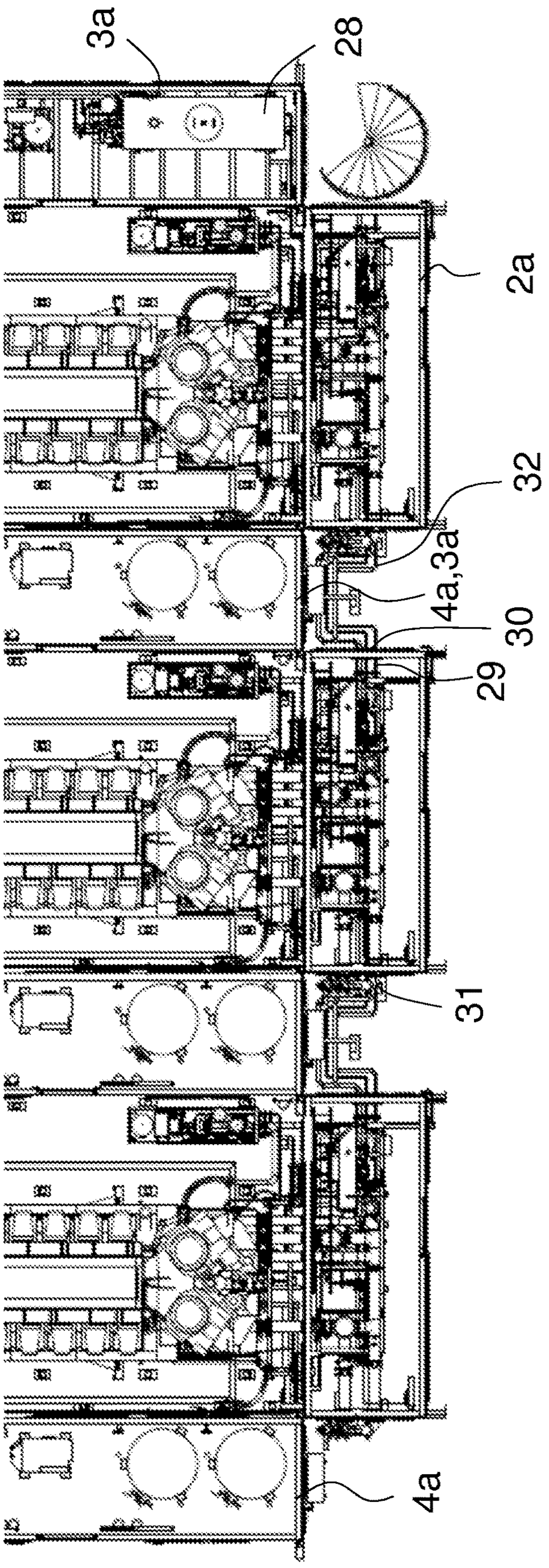
FIG. 4 shows a cross-sectional top view of part of an exemplary power plant.

FIG. 4 shows an exemplary embodiment, where a wall module 2*a* of the rear wall 2 of each power plant construction 10 of the power plant includes connections for the water of the maintenance water tanks 28. A water pipe 29 is arranged within the first wall module 2*a* of each rear wall 2. The water pipe 29 connects a water inlet 30 at one end of the wall module 2*a* to a water outlet 31 at the opposite end of the wall module 2*a*. A connecting pipe 32 connects the water outlet 31 of a wall module 2*a* to a water inlet 30 of a wall module 2*a* of an adjacent power plant construction 10. Water from the maintenance water tanks 28 can thus be conducted within the wall modules 2*a* of the rear walls 2 to each engine 5 of the power plant. Pipes for lube oil and compressed air are arranged in a similar way within the first wall modules 2*a* of the rear wall 2.

Figure 5:
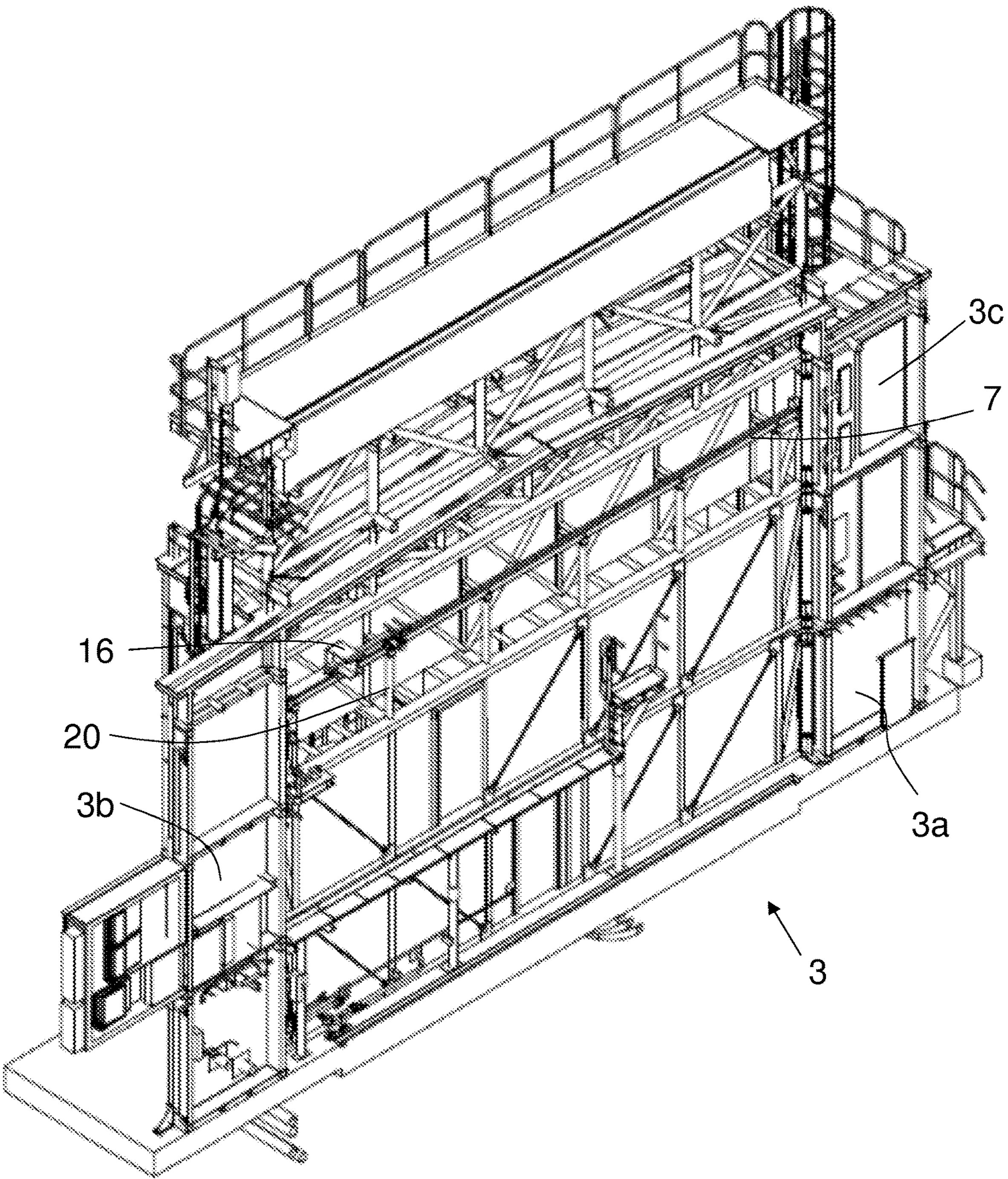
FIG. 5 shows one side wall of a power plant construction according to an exemplary embodiment disclosed herein.
Figure 6:
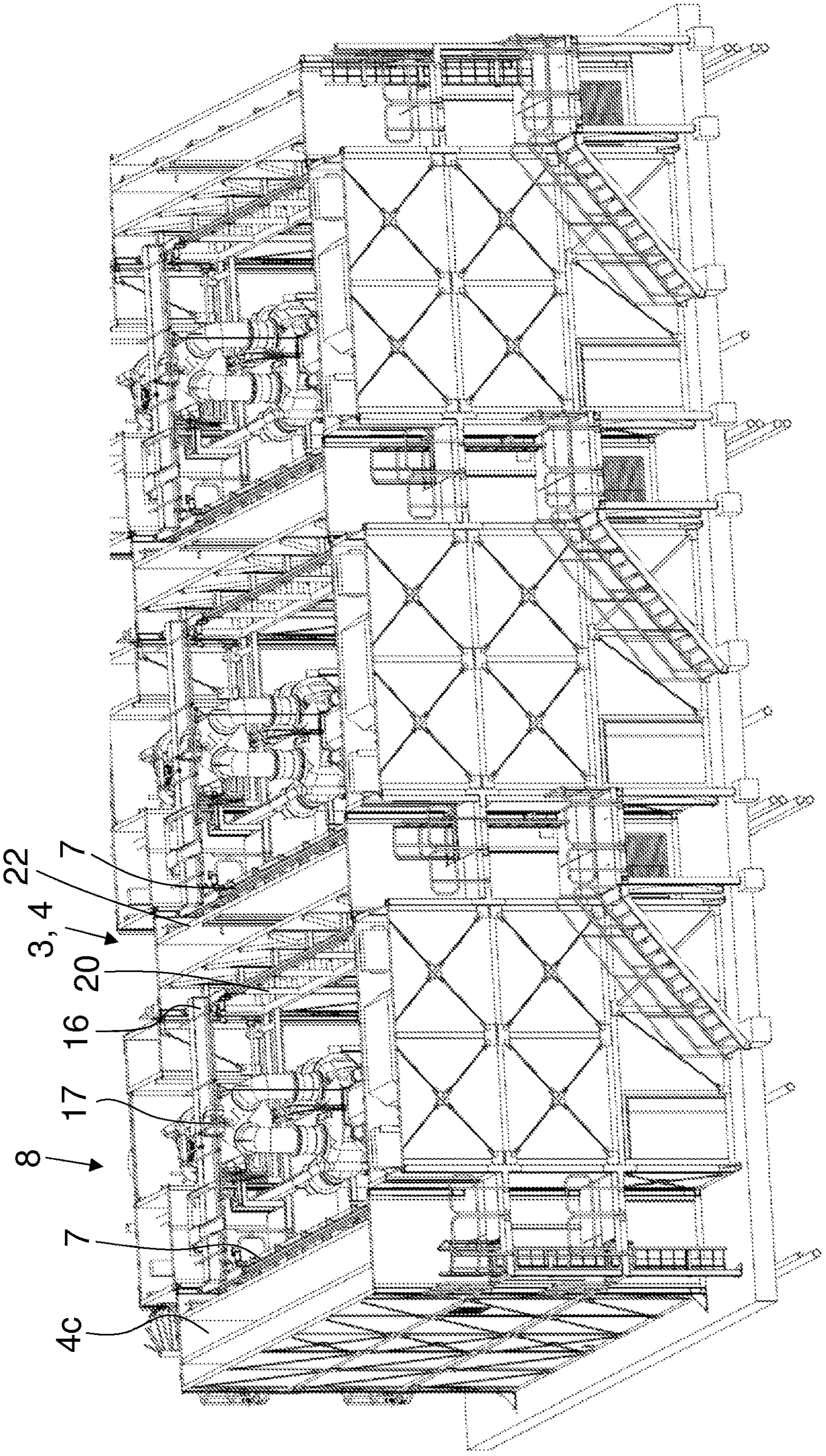
FIG. 6 shows an inside view of a power plant according to an exemplary embodiment disclosed herein.

FIGS. 5 and 6 show exemplary embodiments, where the power plant construction 10 is provided with an overhead crane 8. The overhead crane can also be referred to as a bridge crane. The overhead crane 8 includes a bridge girder 16, which supports a trolley 17. The trolley 17 is configured to be moveable along the bridge girder 16. The overhead crane 8 includes an electric motor for moving the trolley 17 along the bridge girder 16. The trolley 17 carries a hoist, which is used for lifting and lowering a hook that is suspended by means for suspending, such as one or more ropes, which are, for example, steel wires. The overhead crane 8 can be used for maintenance and repair of the engine 5, generator 6 and other equipment. For instance, turbochargers, cylinder heads or other heavy items can be lifted by means for lifting, such as by the crane 8. If the crane 8 is installed before the engine 5 and the generator 6, the crane 8 could also be used during the installation of the engine 5 and the generator 6, for example for lifting parts that are within the lifting capacity of the crane 8.

Each end of the bridge girder 16 is supported by means for supporting, such as a runway beam 7. The bridge girder 16 is configured to be moveable along the runway beams 7. The crane 8 can include one or more electric motors for moving the bridge girder 16. The runway beams 7 are arranged in the third wall modules 3*c*, 4*c* of the first side wall 3 and the second side wall 4. In the exemplary embodiments of FIGS. 5 and 6, the inner side of the third wall module 3*c*, 4*c* is open. The wall modules 3*c*, 4*c* can include support columns 20 for supporting the runway beams 7 in the vertical direction. The runway beam 7 can form part of the frame of the wall module 3*c*, 4*c*. The runway beams 7 can thus be structural elements of the wall modules 3*c*, 4*c*, and no additional support structures for the runway beams 7 are needed. By integrating the runway beams 7 to the wall modules 3*c*, 4*c*, work at a construction site of a power plant can be simplified. By arranging the runway beams 7 inside the wall modules 3*c*, 4*c*, the space within the engine hall can be effectively utilized. The trolley 17 can move close to the inner walls of the engine hall, and the crane 8 can be operated even in the vicinity of the walls.

In the exemplary embodiment of FIG. 6, two adjacent power plant constructions 10 share a common side wall 3, 4. Therefore, the third wall module 3*c*, 4*c* between two adjacent power plant constructions 10 includes two beams 7, each beam functioning as a runway beam for one overhead crane 8. Both sides of the third wall module 3, 4 are open. However, wall panels 22 are arranged between the runway beams 7. The wall panels 22 can be sound-insulating panels. By means for separating, such as by the wall panels 22, the engine halls formed within adjacent power plant constructions can be separated from each other.

The exemplary third wall modules 3*c*, 4*c* can be provided with removable wall panels. This can allow for expanding a power plant by adding a new power plant construction 10 adjacent to an existing power plant construction. A side wall 3, 4 of the existing power plant construction can form a side wall 3, 4 of the new power plant construction. The third wall module 3*c*, 4*c* of the side wall 3, 4 of the existing power plant construction can include a runway beam 7 for the new power plant construction.

Figure 8:
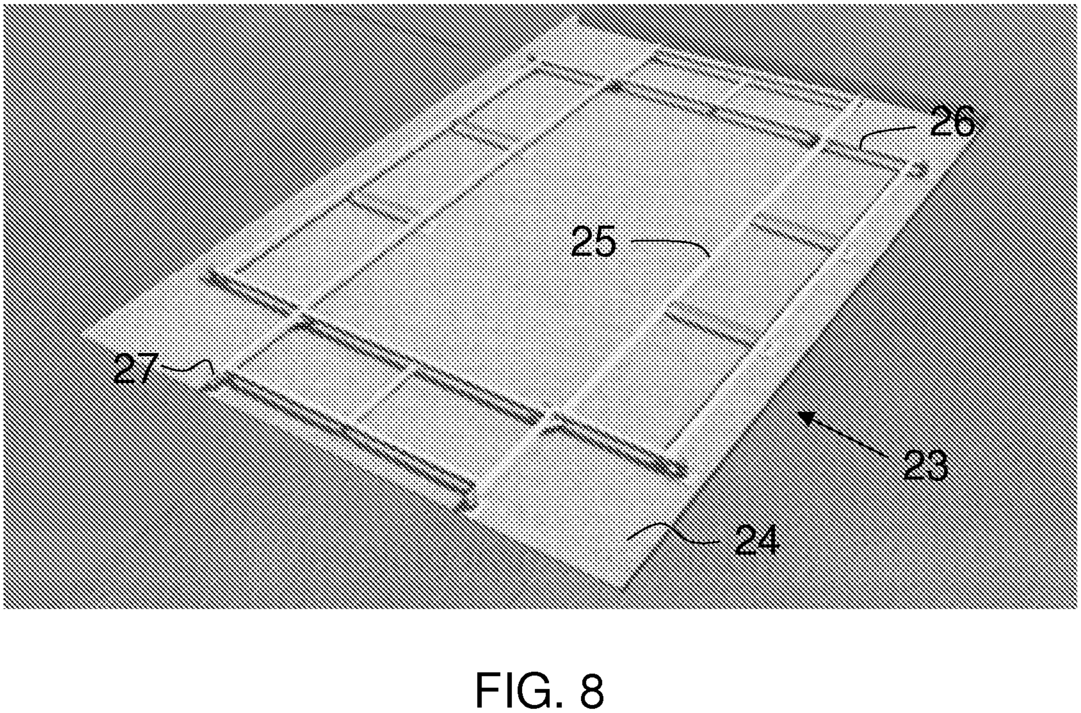
FIG. 8 shows a foundation frame for an exemplary power plant construction before concrete pouring.
Figure 9:
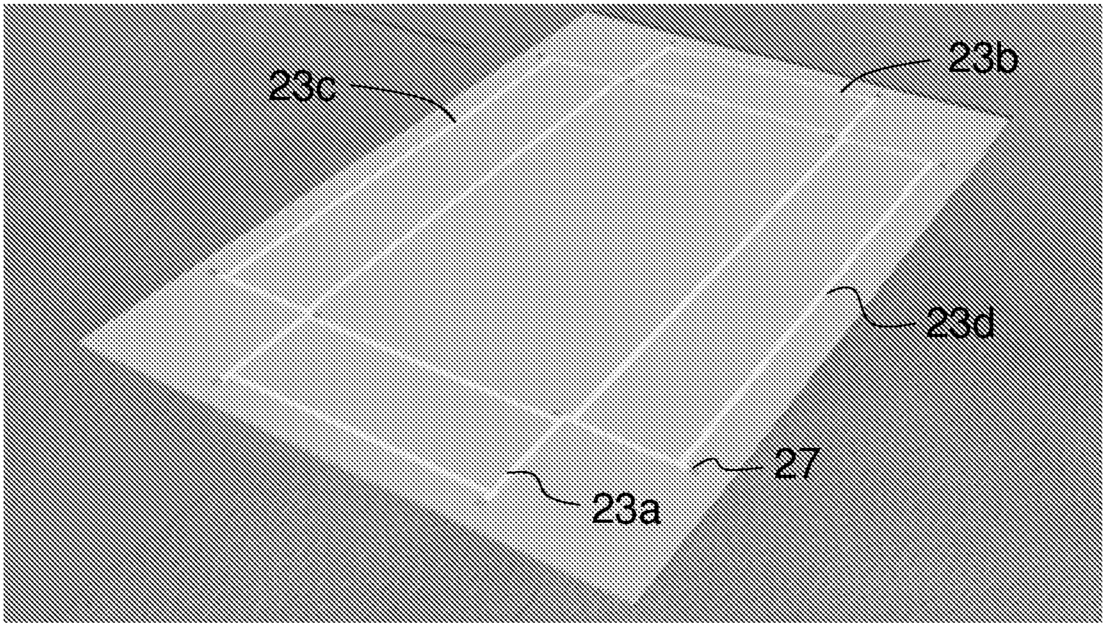
FIG. 9 shows the exemplary foundation frame of FIG. 8 after concrete pouring.

FIGS. 8 and 9 show a foundation frame 23 for a an exemplary power plant construction. The foundation frame 23 is arranged on a concrete slab 24. The concrete slab 24 is arranged on ground. The foundation frame 23 can include supporting beams 25 and stiffening beams 26. The supporting beams 25 are configured to support the first wall modules 1*a*, 2*a*, 3*a*, 4*a* of the walls 1, 2, 3, 4 of a power plant construction 10. The stiffening beams 26 are configured to stiffen the foundation frame 23. The supporting beams 25 and the stiffening beams 26 are steel beams, such as I-beams. The foundation frame 23 can be a welded structure. After the foundation frame 23 has been installed on the concrete slab 24, a space within and around the foundation frame 23 is filled with concrete.

Concrete can be poured up to the level of the upper surfaces of the supporting beams 25. The upper surfaces of the supporting beams 25 remain visible, as shown in FIG. 9. In an exemplary embodiment, the stiffening beams 26 are covered by the concrete. The supporting beams 25 of the foundation frame 23 form four subframes 23*a*, 23*b*, 23*c*, 23*d*, one subframe for each wall 1, 2, 3, 4 of the power plant construction 10. The shape of each subframe 23*a*, 23*b*, 23*c*, 23*d* corresponds to the shape of the bottom of the first wall module 1*a*, 2*a*, 3*a*, 4*a* of the respective wall 1, 2, 3, 4. The subframes are thus rectangular-shaped. Each corner of each subframe is provided with anchoring pins 27, which protrude upwards from the upper surfaces of the supporting beams 25. The anchoring pins 27 facilitate positioning of the first wall modules 1*a*, 2*a*, 3*a*, 4*a*. The first wall modules 1*a*, 2*a*, 3*a*, 4*a* can be attached to the foundation frame 23 by means of the anchoring pins 27.

It will be appreciated by a person skilled in the art that the invention is not limited to the exemplary embodiments described herein, including any readily apparent combination thereof as incorporated herein, but may vary within the scope of the appended claims.

It will also be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A power plant construction configured to accommodate an internal combustion engine and a generator driven by the internal combustion engine, the power plant construction comprising:

a front wall;

a rear wall;

a first side wall; and a second side wall, wherein at least the first side wall and the second side wall of the power plant construction are constructed as modular walls, each modular wall including at least two vertically stacked wall modules, the vertically stacked wall modules being self-supporting modules having a shape of a rectangular prism, wherein the vertically stacked wall modules form a self-supporting wall, wherein each of an uppermost vertically stacked wall module of the first side wall and an uppermost vertically stacked wall module of the second side wall includes a beam that is a structural element of its respective uppermost vertically stacked wall module, wherein each beam runs parallel to longitudinal directions of both the first side wall and the second side wall, wherein each beam functions as a runway beam of an overhead crane.

2. The power plant construction according to claim 1, wherein each beam is arranged inside its respective uppermost vertically stacked wall module.

3. The power plant construction according to claim 2, wherein each vertically stacked wall module is prefabricated and each beam is an integrated part of its respective prefabricated vertically stacked wall module.

4. The power plant construction according to claim 3, wherein each of the front wall and the rear wall is constructed as a modular wall.

5. The power plant construction according to claim 4, wherein each modular wall comprises:

three vertically stacked wall modules.

6. The power plant construction according to claim 5, wherein each vertically stacked wall module is configured to fit into a standardized intermodal container.

7. The power plant construction according to claim 6, wherein the container is a 40-foot high-cube container.

8. The power plant construction according to claim 1, wherein each beam is made of steel.

9. The power plant construction according to claim 1, wherein at least one side wall of each vertically stacked wall module comprises:

a sound insulating panel.

10. The power plant construction according to claim 1, wherein each vertically stacked wall module is configured to fit into a standardized intermodal container.

11. A power plant comprising:

a power plant construction according to claim 1;

an internal combustion engine; and a generator coupled to the internal combustion engine arranged within the power plant construction.

12. The power plant according to claim 11, wherein the power plant comprises:

at least two of the power plant constructions.

13. The power plant according to claim 12, wherein two adjacent power plant constructions share a common side wall.

14. The power plant according to claim 13, wherein one or more vertically stacked wall modules of the common side wall comprises:

equipment serving the internal combustion engine and another internal combustion engine of an adjacent power plant construction of the at least two of the power plant constructions.

15. The power plant according to of claim 14, comprising:

a side wall at one end of the power plant provided with equipment serving the internal combustion engine and any other internal combustion engine of the at least two of the power plant constructions of the power plant.

16. The power plant according to claim 11, comprising:

a water tank for supplying water to a cooling water system of the internal combustion engine.

17. The power plant according to claim 16, wherein one or more vertically stacked wall modules of the rear wall of one of the at least two power plant constructions comprise:

a fluid connection to a corresponding vertically stacked wall module of an adjacent power plant construction of the at least two power plant constructions.

18. The power plant according to claim 17, wherein the fluid connection is a connection for lube oil, cooling liquid or fresh water.

19. The power plant according to claim 18, wherein each power plant construction of the power plant is arranged on a foundation frame that is made of steel beams.

20. The power plant according to claim 12, wherein one or more vertically stacked wall modules of the rear wall of one of the at least two power plant constructions comprise:

a fluid connection to a corresponding vertically stacked wall module of an adjacent power plant construction of the at least two power plant constructions.

* * * * *